(12) United States Patent
Gilleran et al.

(10) Patent No.: US 9,216,819 B2
(45) Date of Patent: Dec. 22, 2015

(54) WHEEL STRUCTURE FOR INTEGRATING AN ELECTRIC DRIVE MOTOR

(75) Inventors: Neal Gilleran, Long Beach, CA (US); Robert M. Sweet, Beaver, UT (US); Jonathan Sidney Edelson, North Plains, OR (US); Rodney T. Cox, North Plains, OR (US); Isaiah Watas Cox, Baltimore, MD (US)

(73) Assignee: Borealis Technical Limited, Gibraltar (GI)

( * ) Notice: Subject to any disclaimer, the term of this patent is extended or adjusted under 35 U.S.C. 154(b) by 128 days.

(21) Appl. No.: 13/074,801

(22) Filed: Mar. 29, 2011

(65) Prior Publication Data

US 2011/0284685 A1    Nov. 24, 2011

Related U.S. Application Data

(60) Provisional application No. 61/341,297, filed on Mar. 29, 2010.

(51) Int. Cl.
*B64C 25/40* (2006.01)

(52) U.S. Cl.
CPC ............. *B64C 25/405* (2013.01); *Y02T 50/823* (2013.01)

(58) Field of Classification Search
CPC ...... B64C 25/405; B64C 25/40; B64C 25/36; Y02T 50/823; B60K 7/0007
USPC .............................. 244/50, 111, 103 S, 103 R
See application file for complete search history.

(56) References Cited

U.S. PATENT DOCUMENTS

| | | | | |
|---|---|---|---|---|
| 1,531,588 A * | 3/1925 | Williams, Jr. | ............. | 244/103 R |
| 2,408,163 A * | 9/1946 | Fodor | ......................... | 244/103 S |
| 2,425,583 A * | 8/1947 | Volk | ........................... | 244/103 S |
| 2,430,163 A * | 11/1947 | Dever | ........................ | 310/67 R |
| 2,457,144 A * | 12/1948 | Goodale | ...................... | 65/59.24 |
| 3,977,631 A | 8/1976 | Jenny | | |
| 5,190,247 A * | 3/1993 | Le Chatelier | ............. | 244/103 R |
| 5,926,017 A * | 7/1999 | Von Grunberg et al. | ...... | 324/166 |
| 7,226,018 B2 * | 6/2007 | Sullivan | ........................ | 244/111 |
| 7,445,178 B2 * | 11/2008 | McCoskey et al. | ............. | 244/50 |
| 2006/0273686 A1 * | 12/2006 | Edelson et al. | ............... | 310/266 |
| 2007/0158497 A1 * | 7/2007 | Edelson et al. | ............ | 244/103 S |
| 2007/0282491 A1 * | 12/2007 | Cox et al. | .......................... | 701/3 |
| 2009/0114765 A1 * | 5/2009 | Cox et al. | ......................... | 244/50 |
| 2009/0152055 A1 * | 6/2009 | Cox | ............................... | 188/71.6 |
| 2009/0186535 A1 * | 7/2009 | Sullivan | ........................... | 440/6 |
| 2009/0261197 A1 * | 10/2009 | Cox et al. | ........................ | 244/50 |
| 2010/0276535 A1 * | 11/2010 | Charuel et al. | .................. | 244/50 |
| 2010/0288873 A1 * | 11/2010 | Cox et al. | ........................ | 244/50 |

FOREIGN PATENT DOCUMENTS

| | | |
|---|---|---|
| GB | 2457144 | 8/2009 |
| WO | WO2008027458 | 3/2008 |

* cited by examiner

*Primary Examiner* — Valentina Xavier

(57) ABSTRACT

A wheel design is provided for an aircraft landing gear wheel that is configured to maximize the space available within a landing gear wheel well to support a motor driver assembly that drives the aircraft wheel when the aircraft is on the ground. The wheel includes inboard and outboard support walls that are spaced apart a selected distance along the wheel axle so that the motor driver assembly components are substantially completely contained within the wheel space defined by the support walls. The preferred motor driver assembly includes an electric motor and a gear and clutch assembly operatively connected to the wheel to drive the wheel and move the aircraft on the ground. The wheel and motor driver assembly described herein may be retrofitted in an existing aircraft wheel without changing existing landing gear components, including tires, piston, and axle.

17 Claims, 1 Drawing Sheet

WHEEL STRUCTURE FOR INTEGRATING AN ELECTRIC DRIVE MOTOR

This application is based on and claims priority from United States Provisional Patent Application No. 61/341,297, filed 29 Mar. 2010, the disclosure of which is fully incorporated herein.

TECHNICAL FIELD

The present invention relates generally to wheel structures adapted to support a motor integrally within the volume of the wheel structure and, specifically, to an aircraft wheel configured to support an electric motor designed to be mounted within an aircraft wheel well to drive the aircraft wheel.

BACKGROUND OF THE INVENTION

As air travel has increased over the past decades, airport facilities have become more crowded and congested. Minimizing the time between the arrival of an aircraft and its departure to maintain an airline's flight schedule, and also to make a gate or parking location available without delay to an incoming aircraft, has become an airline priority. The safe and efficient ground movement of a large number of aircraft simultaneously into and out of the ramp and gate areas has become increasingly important. As airline fuel costs and safety concerns and regulations have increased, use of the aircraft main engines is no longer the best option for achieving the desired safe and efficient ground movement.

Various alternatives to the use of an aircraft's main engines to move an aircraft on the ground have been tried. The use of a tug or tow vehicle to move an aircraft into and out of a gate or parking location can eliminate the need to use the aircraft main engines. This option, however, is not without its own challenges and costs. More ground vehicles, requiring more fuel and more ground personnel to operate them, add to an already congested environment in the gate area. Restricted use of the aircraft engines on low power during arrival at or departure from a gate is an additional option. This option is also problematic, however. Not only does engine use consume fuel, it is also noisy, and the associated safety hazards of jet blast and engine ingestion in a congested area are significant concerns that cannot be overlooked.

The use of a motor structure integrally mounted with a wheel to rotate the wheel and drive a vehicle, including an aircraft, has been proposed. The use of such a structure, ideally, could move an aircraft with minimal or no use of an aircraft's main engines. In U.S. Pat. No. 2,430,163, for example, Dever describes a motor that may be incorporated in an aircraft landing gear wheel in which the stator is mounted on a stationary part of a wheel assembly and the rotor is connected to the revolving part of the wheel to produce a high rotating torque near the periphery of the wheel. The structure described by Dever includes disc type wheels with webs that are dished to form a conical space near the hub to accommodate the motor. Dever does not suggest a wheel configuration that maximizes this space. Other patent art, such as U.S. Pat. No. 3,977,631 to Jenny, also describe drive motors associated with aircraft gear wheels intended to drive an aircraft on the ground. The motor assembly disclosed by Jenny is selectively coupled to an aircraft wheel through a rotatably mounted brake apparatus in which the normally non-rotating stator is rotatably mounted and driven. The configuration of the wheel itself is not mentioned.

In U.S. Pat. No. 7,445,178, McCoskey et al describe a powered nose aircraft wheel system with a multifunctional wheel motor coupled to the wheel axle and the wheel. The motor is located within the hub of the wheel, and the wheels are free to spin on an axle strut by rim bearings. The stator winding is rigidly fixed to the axle and partially contained by a rotor, which rotates on bearings about the axle. The wheel shape shown by McCoskey et al does not integrate the motor within the wheel, nor is it suggested that wheel supports could be located to maximize the space available for supporting the motor within the wheel. U.S. Pat. No. 7,226,018 to Sullivan also describes a wheel motor useful in an aircraft landing gear wheel. This wheel hub motor/generator disks stack includes within the stack alternating rotor and stator disks, in which the rotors are coupled to the wheel, and is designed to provide motive force to an aircraft wheel when electric power is applied. Sullivan is silent, however, with respect to the specific shape of the wheel structure. None of the foregoing patents suggests a wheel structure that is configured to maximize the limited landing gear space available to support within the wheel a compact motor assembly capable of powering an aircraft drive Wheel that could be easily installed on an existing aircraft without the modification of other landing gear structures. This art, moreover, does not contemplate a wheel structure shaped to support an integral configuration of the motor components that provides easy access to the motor components for maintenance and repair when the motor is not in operation.

Published United States patent applications, including U.S. Patent Application Publication Nos. US2006/0273686 to Edelson, US2007/0282491 to Cox et al, US2009/0152055 to Cox, US2009/0261197 to Cox, International Patent Application Publication No. WO 2008/027458 to Cox et al, and British Patent No. 2457144, owned in common with the present invention, describe aircraft drive systems that use electric drive motors to power aircraft wheels and move an aircraft on the ground. These disclosures focus on specific aspects of the drive systems and motor assemblies, including drive system data, motor design, tire profile, and motor cooling, rather than on a wheel structure specifically configured to maximize space within the wheel well to integrally support motor components and landing gear wheel components without changes to the aircraft landing gear.

A need exists, therefore, for a wheel structure specifically configured to maximize the space available to support an electric motor assembly and designed to fit integrally within an aircraft wheel and efficiently with other existing components without changes to the aircraft landing gear components.

SUMMARY OF THE INVENTION

It is a primary object of the present invention, therefore, to provide a wheel structure specifically configured to maximize the space available to support an electric motor assembly and designed to fit integrally within an aircraft wheel and efficiently with other existing components without changes to the aircraft landing gear components.

It is another object of the present invention to provide a wheel structure configured to support an electric motor integrated with an aircraft gear wheel that does not require replacement of the aircraft's existing axle, wheel, tires, piston, or other landing gear components.

It is an additional object of the present invention to provide a wheel structure configured to support an electric motor integrated with an aircraft gear wheel that does not require change or re-certification for the aircraft's wheel rim width, tire bead, or bead seat and can be retrofitted in an existing aircraft landing gear.

It is a further object of the present invention to provide a wheel structure configured to support an electric motor integrated with an aircraft gear wheel assembly that minimizes spin-up weight and maximizes the space available within the landing gear for installation of the motor.

It is yet another object of the present invention to provide an aircraft gear wheel and drive motor assembly design in which the wheel is not structurally supported by the motor or the motor driver.

It is yet a further object of the present invention to provide a wheel configured to support an electric motor and aircraft gear wheel assembly that provides easy access to motor components for maintenance or repair after installation of the assembly.

It is a yet further object of the present invention to provide a wheel structure shaped to support an electric motor integrated with an aircraft gear wheel that provides a solid thermal connection between the motor and the wheel axle and landing gear piston to facilitate heat dissipation from the motor and wheel assembly.

In accordance with the aforesaid objects, a wheel structure configured to support an electric motor integrally incorporated into an aircraft landing gear wheel to enable the aircraft gear wheel to be driven on the ground independently of the aircraft main engines is provided. The wheel configuration is designed to maximize the space available in an existing aircraft landing gear wheel well to support a motor, preferably an electric motor, within this space without changing the existing landing gear components. This wheel and motor driver assembly effectively powers the wheel within which it is installed to drive the aircraft on the ground. Maintenance, such as tire changes, and service of the motor is much simplified by the configuration of the wheel structure and motor driver assembly of the present invention.

Other objects and advantages will be apparent from the following description, drawings, and claims.

DETAILED DESCRIPTION OF THE INVENTION

The many advantages of being able to drive an aircraft on the ground independently without using the aircraft main engines, as discussed above, have been acknowledged. Integrating a motor within an aircraft gear wheel as the aircraft is being constructed does not present problems because the space available for landing gear components, including motors for driving gear wheels, can be adjusted as required. Retrofitting existing aircraft presents challenges, however. Because of the unique configuration of the wheel, the integral wheel and motor driver assembly of the present invention overcomes these challenges and provides a wheel and motor driver assembly that can be fitted into the limited space available for aircraft landing gear components without modifying any of the other landing gear components. As a result, an aircraft's existing wheel well, tire, axle, piston, and other landing gear components can be used with this integrated wheel and motor driver assembly. The wheel and motor driver assembly of the present invention is designed to make it possible to retrofit existing aircraft simply and effectively so that these older aircraft can achieve the fuel and cost savings and other advantages of aircraft ground movement that is independent of the aircraft engines and external ground vehicles.

Since landing gears on existing aircraft are already completely designed to function without additional components like electric drive motors, there is not much space available for a motor, a clutch, if required, electrical connections, or other structures. Modifications that require changes to the landing gear axle or piston, which have been suggested, would be expensive and time consuming, in large part because any changes from existing structure would require re-certification by regulatory authorities such as the United States Federal Aviation Administration (FAA) and equivalent international regulatory authorities.

Figure 1:
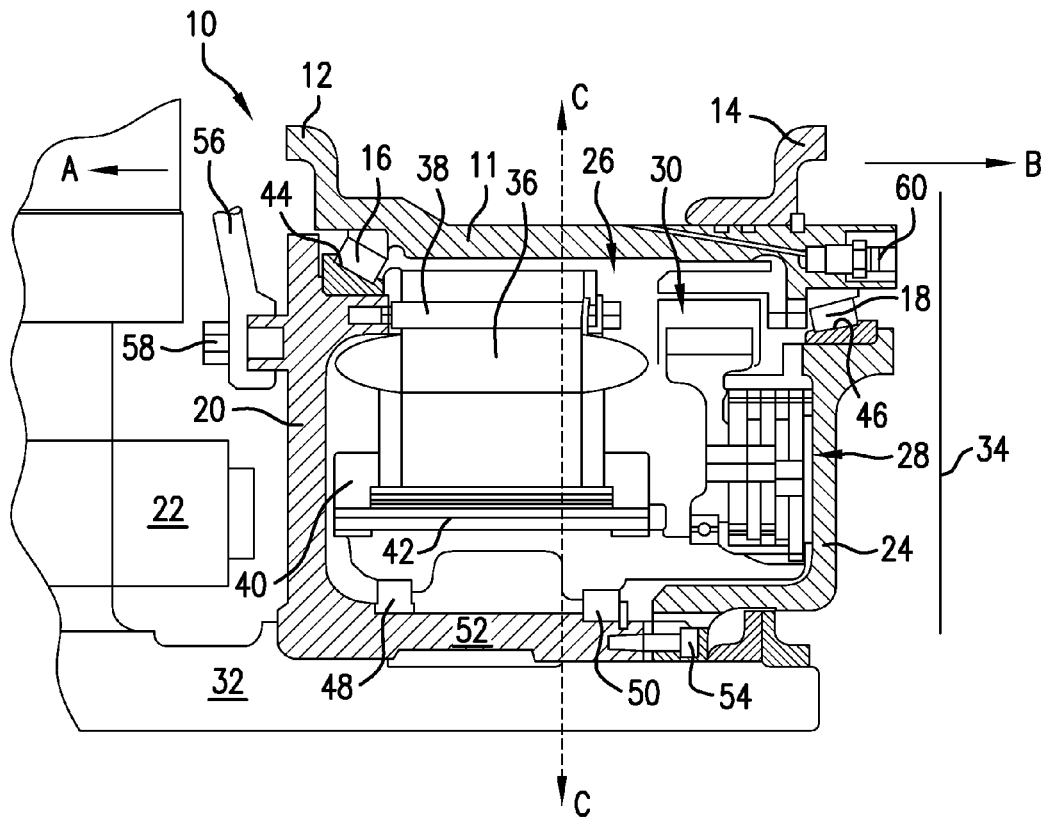
FIG. 1 is a diagrammatic illustration of a preferred wheel and motor driver assembly configuration in accordance with the present invention.

FIG. 1 illustrates diagrammatically a wheel and motor driver assembly according to the present invention. The overall configuration of the present wheel and motor driver assembly will be compared to one prior art wheel and motor arrangement in connection with the discussion of FIG. 2 below. In FIG. 1, the arrows A and B indicate, respectively, the inboard and outboard orientation of the assembly with respect to an aircraft landing gear.

Figure 2:
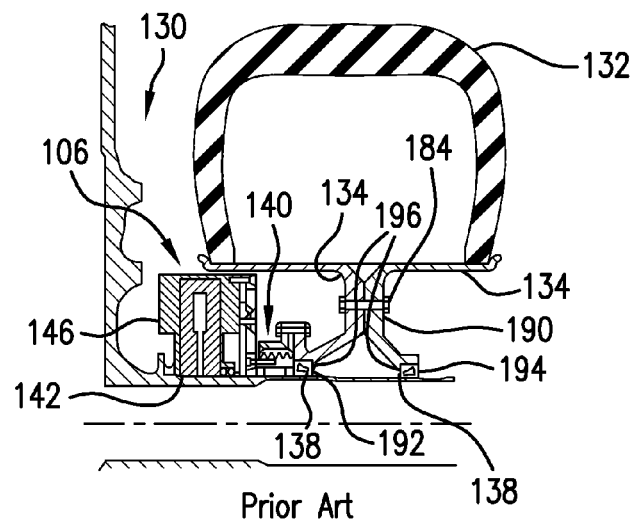
FIG. 2 illustrates a prior art wheel and motor assembly for an aircraft landing gear.

FIG. 1 clearly shows that the wheel 10 of the present wheel and motor driver assembly has a configuration that is different from a common standard wheel shape and from the shape shown in FIG. 2. The common standard wheel shape typically bends inwardly toward the inboard direction from the outer rim. The wheel configuration of the present invention bulges instead in the opposite direction, toward the outboard direction. This configuration maximizes the internal wheel volume and provides maximum space for a motor driver assembly to fit substantially completely within the wheel space provided.

A tire support wall 11 of wheel 10 supports a tire (not shown in FIG. 1) on tire flanges 12 and 14 and is connected to the motor driver assembly structures through bearings 16 and 18, as will be explained below.

A support wall or side plate 20 is the inboard, or inside, support wall for the wheel 10. Unlike in a conventional wheel, the support wall 20 does not rotate. The shape and location of wall 20 are selected so that this structure is located as close as possible to the landing gear piston 22. Although not shown, a pass-through for wiring, preferably in the form of a wiring harness, is provided in wall 20. An outboard, or outside, support wall or side plate 24 is located opposite the inboard support wall 20. As shown in FIG. 1, a motor driver assembly 26 is enclosed completely within the wheel boundaries formed by the respective inboard and outboard support walls 20 and 24.

In the embodiment shown in FIG. 1, the motor driver assembly 26 includes a stator 36, preferably mounted by a precision fitted flanged tube 38 to ensure the alignment of the stator stack. Multiple screws or suitable fasteners (not shown) are preferably provided to hold the stator to the wheel inboard support wall 20. A rotor 40 is shown mounted on a splined shaft 42. Screws (not shown) are preferably provided to squeeze the rotor stack together. While this arrangement of rotor and stator components is preferred, other rotor and stator designs that are configured to fit within the wheel well volume are also contemplated to be within the scope of the present invention.

An electric motor preferred for use with the wheel and motor driver assembly of the present invention could be any one of a number of designs, for example an inside-out motor attached to a wheel hub in which the rotor can be internal to or external to the stator, such as that shown and described in U.S. Patent Application Publication No. 2006/0273686, the disclosure of which is incorporated herein by reference. A toroidally-wound motor, an axial flux motor, or any other electric motor geometry known in the art is also contemplated to be suitable for use in the present invention.

The electric motor selected should be able to move an aircraft gear wheel at a desired speed and torque. One kind of electric drive motor preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of electric motor capable of driving a gear wheel to move an aircraft on the ground, including but not limited to electric induction motors, permanent magnet brushless DC motors, and switched reluctance motors may also be used. Other motor designs capable of high torque operation across the desired speed range that can be integrated into an aircraft wheel to function as described herein may also be suitable for use in the present invention.

The preferred motor driver assembly 26 includes a gear system 28. While the preferred gear system 28 is a system of planetary gears as shown, any other type of gear system that can function for the desired purpose could also be employed. The motor driver assembly 26 is preferably not attached to the wheel 10 at all times during operation. To achieve this, a clutch 30 is preferably provided to selectively engage and disengage the gears 28 and, thus, the motor driver assembly 26 from the wheel as required. A motor that does not require a clutch could also be installed within the wheel as shown and is contemplated to be within the scope of the present invention.

The wheel 10 and motor driver assembly 26 preferably rest on and are supported by the landing gear wheel axle 32, as shown. Other arrangements whereby a motor and driver assembly may be supported within a gear wheel relative to an axle may also be employed.

Maximum space is provided for the structures of the motor driver assembly 26 by locating the inboard and outboard wheel support walls 20 and 24 as far as possible from the midpoint, represented by the line C-C, of the wheel 10 and axle 32. The outboard support wall 24 must be positioned to avoid coming into contact with the narrowest part of the wheel well or landing gear doors, which is represented by the vertical boundary line 34. The outboard support wall 24 may be located a selected distance inboard of the wheel well boundary line 34, as shown, or further outboard, if required.

The inboard wheel support wall 20 and the outboard wheel support wall 24 are provided with notches 44 and 46, respectively, shaped to receive bearings 16 and 18. The wheel support walls are coupled together through the notches 44 and 46 to ensure sufficient axial play that the bearings 16 and 18 can be preloaded. Additional bearings 48 and 50 support the motor driver assembly 26 on an axle-contacting extension 52 of the inboard support wall 20. Bolts or suitable fasteners, such as bolt 54, are provided to hold the support walls together so the entire wheel and motor driver assembly can be removed as a unit.

Alternatively, one or both of the inboard or outboard support walls could be completely or partially replaced by one or more of the motor driver components. For example, the stator 36 could replace support wall 20, and/or the gear assembly 28 could replace support wall 24.

A torque arm 56 configured to be connected at one end by a bolt 58 or like fastener to the inboard support wall 20 provides a mechanical connection between the motor components and a non-rotating landing gear structure to provide for a torque reaction. Examples of non-rotating landing gear components that could be connected to the opposite end of the torque arm 56 are tow fitting ears or a tow jack (not shown).

A valve stem 60 is positioned above bearing 18 and the outboard support wall 24 to allow easy access to the wheel tire and valve (not shown) to check tire pressure and inflate the tire, if necessary. The valve stem can be accessed from the outboard side of the wheel without interfering with the motor drive assembly. Moreover, the arrangement of the motor driver assembly 26 within the wheel 10 of the present invention makes changing a tire mounted on the wheel a significantly easier process than changing a tire on existing aircraft wheels. The motor and driver assembly does not have to be removed from the aircraft and can stay in place within the wheel as shown in FIG. 1. As a result, the amount of wheel mass that must be removed from the aircraft during a tire change is reduced considerably, since the bulk of the inboard support wall supports motor mass that can stay connected to the aircraft. In addition, the use of a low profile tire, such as that disclosed in International Patent Application No. WO 2008/027458, the disclosure of which is incorporated herein by reference, can also help maximize the space available inside the wheel well.

Not only are tire changes easier with the wheel and motor driver assembly of the present invention, but servicing the motor driver assembly can be performed without disconnecting electric connections between the motor and a wire harness (not shown) that leads into the aircraft fuselage. Moreover, the wheel and motor driver assembly shown in FIG. 1 is configured to permit easy access to motor components, such as the stator 36, rotor 40 or bearings 16 and 18, after simply removing the wheel 10. This configuration additionally facilitates sealing the motor driver assembly from contaminants, such as water, ice, and snow, and highly corrosive materials, such as the deicing chemicals and hydraulic fluids commonly used at airports.

A major advantage of the design of the wheel 10 and motor driver assembly 26 is achieved by the continued use of the existing tires, axle 32, and piston 22 already in use on an aircraft. Since these structures are not altered from their original condition or otherwise changed in any way by the installation of the present wheel and motor driver assembly, the rim width, tire bead, and bead seat would not require re-certification by the FAA or other authorities, thus eliminating a potentially time consuming and costly process. As a result, the wheel and motor driver assembly described herein is especially well suited for installation on existing aircraft.

Another advantage of using the wheel and motor drive assembly design of the present invention in an aircraft landing gear assembly is the ability to minimize spin-up loads for the wheel by removing considerable motor mass as compared to existing landing gear designs that include motors. The motor is able to spin-up and match the wheel speed before the clutch is engaged. This allows the electric drive to connect or disconnect as required without bringing the aircraft to a halt before engaging or disengaging the motor driver assembly.

A further advantage presented by the wheel and motor driver assembly shown in FIG. 1 is the solid thermal connection between the motor driver assembly and the axle and piston hardware. This connection enables the shedding of heat through those large metallic components. Other arrangements for dissipating heat in a motor-driven aircraft gear wheel could also be used to enhance the heat dissipation by the thermal connection. An example of a system that can be employed effectively to cool wheel motors is described in U.S. Patent Application Publication No. US2009/0152055, which is incorporated herein by reference. This system includes providing a rotor with fan-shaped projections or, alternatively, holes or tunnels, in connection with a fan, to conduct warm air from inside the motor and wheel assembly to the outside.

None of the foregoing advantages or any of the other advantages presented by the wheel and motor driver assembly of the present invention are demonstrated by prior art aircraft landing gear wheel and motor designs. FIG. 2 shows one such prior art design, which is described and shown in U.S. Pat. No. 7,445,178. A landing gear system 130 includes a tire 132 attached to a wheel 134. A wheel motor 106 with a rotor 146 and a stator 142 drives the wheel. The configuration of the wheel and motor assembly shown in FIG. 2 differs in significant respects from that of the present invention, not the least of which is that this assembly incorporates primarily the wheel support structures within the space between the wheel and the axle. This arrangement does not maximize the space available to integrate the motor or drive mechanism substantially completely within the wheel. Consequently, the arrangement shown in FIG. 2 will not realize the significant advantages of the arrangement of the present invention.

The wheel and motor driver assembly of the present invention has been described in connection with a single aircraft gear wheel. This assembly can also be used simultaneously on more than one aircraft wheel, including one or more of the nose wheels or the other aircraft wheels.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability in retrofitting existing aircraft with effective and efficient wheel and motor driver assemblies without modifying existing landing gear components when it is desired to provide the advantages and benefits that can be achieved by powering aircraft gear wheels to drive an aircraft on the ground.

The invention claimed is:

1. An aircraft landing gear wheel and drive motor assembly for driving an aircraft on a ground surface independently of the aircraft main engines comprising:
   a. a wheel structure supported on an axle in an aircraft landing gear wheel well, wherein said wheel structure comprises a plurality of wheel support wall sections connected to each other to define a maximum space available within said landing gear wheel well maximum inboard and outboard boundaries; wherein said plurality of wheel support wall sections comprises at least an inboard support wall section and an opposed parallel outboard support wall section, respectively positioned at said wheel well maximum inboard and outboard boundaries and a wheel tire support wall section positioned to extend between said opposed inboard and outboard support walls sections to support a tire mounted on said wheel structure, wherein said inboard support wall section and said opposed outboard wall section are configured to form an axle-contacting portion of said wheel opposite said wheel tire support wall, thereby defining maximum space available within said maximum inboard and outboard boundaries; and
   b. a drive motor assembly designed to be supported by said plurality of wheel support wall sections to be enclosed completely within said plurality of wheel support wall sections in said space available within said landing gear wheel well without changing existing landing gear components and adapted to be in driving connection with said wheel structure to drive a landing gear wheel and move said aircraft on a ground surface independently of the aircraft main engines.

2. An assembly as described in claim 1, wherein said plurality of wheel support wall sections comprises an aircraft nose landing gear wheel.

3. An assembly as described in claim 1, wherein said wheel structure and said drive motor assembly are configured to be enclosed completely within said space available within said landing gear wheel in an existing aircraft without changing existing aircraft landing gear tires, axle, or piston.

4. The assembly for driving an aircraft on a ground surface independently of the aircraft main engines of claim 1,
   wherein said inboard support wall section is located along the axle close to a landing gear piston and an outboard support wall section is positioned outboard of the inboard support wall section a selected distance inboard of a narrowest part of the wheel well to define said maximum space available within said landing gear wheel well maximum inboard and outboard boundaries to support and enclose completely said drive motor assembly within said plurality of wheel support wall sections.

5. An aircraft landing gear wheel and drive motor assembly for driving an aircraft on a ground surface independently of the aircraft main engines comprising:
   a. a wheel structure supported on an axle in an aircraft landing gear wheel well, wherein said wheel structure is configured to define a maximum functional volume within a space defined by said landing gear wheel well maximum inboard and outboard boundaries, and wherein said wheel structure comprises a plurality of wheel support wall sections, including at least an inboard support wall section and an opposed parallel outboard support wall section, respectively positioned at said wheel well maximum inboard and outboard boundaries and a wheel tire support wall section positioned to extend between said opposed inboard and outboard support walls sections to support a tire mounted on said wheel, wherein said inboard support wall section and said opposed outboard wall section are configured to form an axle-contacting portion of said wheel opposite said wheel tire support wall, thereby defining said maximum functional volume; and
   b. a drive motor assembly designed to be mounted completely within said defined maximum functional volume in said wheel structure in driving connection with said wheel structure to drive a landing gear wheel and move said aircraft on a ground surface independently of the aircraft main engines.

6. An assembly as described in claim 5, wherein said inboard support wall and said outboard support wall are spaced apart a distance selected to maximize said functional volume.

7. An assembly as described in claim 5, wherein said drive motor assembly comprises at least a drive motor and a gear assembly configured and positioned to fit substantially completely within said defined functional volume.

8. An assembly as described in claim 7, wherein said drive motor and said gear assembly are operationally supported by said inboard and outboard support walls.

9. An assembly as described in claim 7, wherein said drive motor comprises a rotor element and a stator element and at least one of said rotor element or said stator element is mounted on said inboard support wall.

10. An assembly as described in claim 6, wherein said wheel tire support wall section is supported on each of said inboard and outboard support walls by a pair of bearing means supportingly contacting said wheel tire support wall section and configured to fit within correspondingly configured notches in said inboard and outboard support walls.

11. An assembly as described in claim 8, wherein said drive motor is supported by said inboard support wall and said inboard support wall includes torque arm means connected to a non-rotating landing gear component to provide for a torque reaction.

12. An assembly as described in claim 7, wherein said drive motor comprises an electric motor selected from the group consisting of axial flux motors, toroidally wound motors, electric induction motors, permanent magnet brushless DC motors, and switched reluctance motors.

13. An assembly as described in claim 7, further comprising a clutch operatively disposed between said drive motor and said gear assembly.

14. An assembly as described in claim 5, wherein said wheel structure inboard support wall section comprises tire valve stem access means for facilitating access to a valve of a tire mounted on said wheel.

15. The assembly of claim 5, wherein said assembly is adapted for installation in a wheel well of an aircraft without changing existing aircraft landing gear components or structures.

16. The assembly of claim 15, wherein said existing landing gear components comprise at least an axle, a piston, and a tire.

17. An aircraft landing gear wheel and drive motor assembly for installation in an existing aircraft to drive the aircraft on a ground surface independently of the aircraft main engines comprising:
 a. a wheel designed to be supported on an axle in an aircraft landing gear wheel well in an existing aircraft, wherein said wheel comprises a plurality of wheel support wall sections, including at least an inboard support wall section and an opposed parallel outboard support wall section, respectively positioned at said wheel well maximum inboard and outboard boundaries and a wheel tire support wall section positioned to extend between said opposed inboard and outboard support walls sections to support a tire mounted on said wheel, wherein said inboard support wall section and said opposed outboard wall section are configured to form an axle-contacting portion of said wheel opposite said wheel tire support wall to define a maximum functional volume within said landing gear wheel well; and
 b. a drive motor assembly comprising a drive motor, a gear assembly drivingly connected with said drive motor, and a clutch in operative connection with said gear assembly and said drive motor, said assembly being designed to be mounted completely within said defined maximum functional volume in said wheel in driving connection with said wheel to drive said wheel and move said aircraft on a ground surface independently of the aircraft main engines, wherein said wheel and drive motor assembly are configured to be installed in said aircraft landing gear wheel without changing landing gear components.

\* \* \* \* \*